United States Patent
Schmidt et al.

(10) Patent No.: US 9,532,255 B2
(45) Date of Patent: Dec. 27, 2016

(54) MEASUREMENT TRIGGERS FOR CUSTOMER CARE IN A WIRELESS NETWORK

(71) Applicant: INTEL IP CORPORATION, Santa Clara, CA (US)

(72) Inventors: Andreas Schmidt, Braunschweig (DE); Martin Hans, Bad Salzdetfurth (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/127,607

(22) PCT Filed: Nov. 8, 2013

(86) PCT No.: PCT/US2013/069089
§ 371 (c)(1),
(2) Date: Dec. 19, 2013

(87) PCT Pub. No.: WO2015/030845
PCT Pub. Date: Mar. 5, 2015

(65) Prior Publication Data
US 2015/0223092 A1 Aug. 6, 2015

Related U.S. Application Data

(60) Provisional application No. 61/872,591, filed on Aug. 30, 2013.

(51) Int. Cl.
*H04M 3/00* (2006.01)
*H04W 24/10* (2009.01)
(Continued)

(52) U.S. Cl.
CPC ............. *H04W 24/10* (2013.01); *H04W 16/18* (2013.01); *H04W 28/08* (2013.01); *H04W 28/24* (2013.01);
(Continued)

(58) Field of Classification Search
CPC ... H04W 88/06; H04W 36/0022; H04W 24/10
See application file for complete search history.

(56) References Cited

U.S. PATENT DOCUMENTS

2008/0293436 A1* 11/2008 Fok et al. ............... 455/456.2
2011/0305159 A1 12/2011 Hofmann et al.
(Continued)

FOREIGN PATENT DOCUMENTS

| CN | 105409276 A | 3/2016 |
| WO | WO-2011041753 A2 | 4/2011 |
| WO | WO-2013025014 A2 | 2/2013 |

OTHER PUBLICATIONS

"International Application Serial No. PCT/US2013/069089, International Search Report mailed May 19, 2014", 3 pgs.
(Continued)

*Primary Examiner* — Keith Fang
(74) *Attorney, Agent, or Firm* — Schwegman Lundberg & Woessner, P.A.

(57) ABSTRACT

An embodiment for a method for activation of customer care measurement operations is disclosed. The method may include an infrastructure generating customer care configuration parameters, a base station transmitting the customer care configuration parameters to a mobile device, the infrastructure receiving from the mobile device in response to the customer care configuration parameters a request for customer care measurements operations and/or customer care measurement results. In one embodiment the customer care measurement configuration is realized by means of MDT (Minimization of Drive Test) measurement configuration. In another embodiment the customer care measurement operations comprise MDT (Minimization of Drive Test) measurements.

7 Claims, 9 Drawing Sheets

(51) Int. Cl.
*H04W 36/00* (2009.01)
*H04W 16/18* (2009.01)
*H04W 28/24* (2009.01)
*H04W 28/08* (2009.01)
*H04W 88/06* (2009.01)

(52) U.S. Cl.
CPC ......... *H04W 36/0022* (2013.01); *H04W 88/06* (2013.01)

(56) References Cited

U.S. PATENT DOCUMENTS

| | | | | |
|---|---|---|---|---|
| 2012/0207043 | A1* | 8/2012 | Geirhofer et al. | 370/252 |
| 2013/0128756 | A1 | 5/2013 | Zhang | |
| 2013/0223267 | A1* | 8/2013 | Jung et al. | 370/252 |
| 2015/0056925 | A1* | 2/2015 | Jung | H04W 24/10 455/67.11 |
| 2015/0289141 | A1* | 10/2015 | Ghasemzadeh | H04W 72/044 370/330 |

OTHER PUBLICATIONS

"International Application Serial No. PCT/US2013/069089, Written Opinion mailed May 19, 2014", 7 pgs.
"Specification of the SIM Application Toolkit for the Subscriber Identity Module—Mobile Equipment (SIM—ME) interface", 3GPP TS 51.014 V4.5.0 (Release 4), (Dec. 2004), 86 pgs.
"Technical Specification Group Core Network and Terminals; Characteristics of the Universal Subscriber Identity Module (USIM) application", 3GPP TS 31.102 V11.4.0 (Release 11), (Dec. 2012), 230 pgs.
"Technical Specification Group Core Network and Terminals; Universal Subscriber Identity Module (USIM) Application Toolkit (USAT)", 3GPP TS 31.111 V11.4.0 (Release 11), (Dec. 2012), 124 pgs.
"Technical Specification Group Radio Access Network; Evolved Universal Terrestrial Radio Access (E-UTRA) and Evolved Universal Terrestrial Radio Access Network (E-UTRAN); Overall description; Stage 2", 3GPP TS 36.300 V11.4.0 (Release 11), (Dec. 2012), 208 pgs.
"Technical Specification Group Radio Access Network; Evolved Universal Terrestrial Radio Access (E-UTRA); Radio Resource Control (RRC); Protocol specification", 3GPP TS 36.331 V11.2.0 (Release 11), (Dec. 2012), 340 pgs.
"Technical Specification Group Radio Access Network; Evolved Universal Terrestrial Radio Access (E-UTRA); User Equipment (UE) procedures in idle mode", 3GPP TS 36.304 V11.2.0 (Release 11), (Dec. 2012), 33 pgs.
"Technical Specification Group Radio Access Network; Evolved Universal Terrestrial Radio Access Network (E-UTRAN); S1 Application Protocol (S1AP)", 3GPP TS 36.413 V11.2.1 (Release 11), (Feb. 2013), 272 pgs.
"Technical Specification Group Radio Access Network; Study on Minimization of drive-tests in Next Generation Networks", 3GPP TR 36.805 V9.0.0 (Release 9), (Dec. 2009), 24 pgs.
"Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2", 3GPP TS 37.320 V11.2.0 (Release 11), (Dec. 2012), 22 pgs.
"Technical Specification Group Services and System Aspects; General Packet Radio Service (GPRS) enhancements for Evolved Universal Terrestrial Radio Access Network (E-UTRAN) access", 3GPP TS 23.401 V11.4.0 (Release 11), (Dec. 2012), 284 pgs.
"Technical Specification Group Services and System Aspects; Telecommunication management; Subscriber and equipment trace; Trace control and configuration management", 3GPP TS 32.422 V11.6.0 (Release 11), (Dec. 2012), 131 pgs.

* cited by examiner

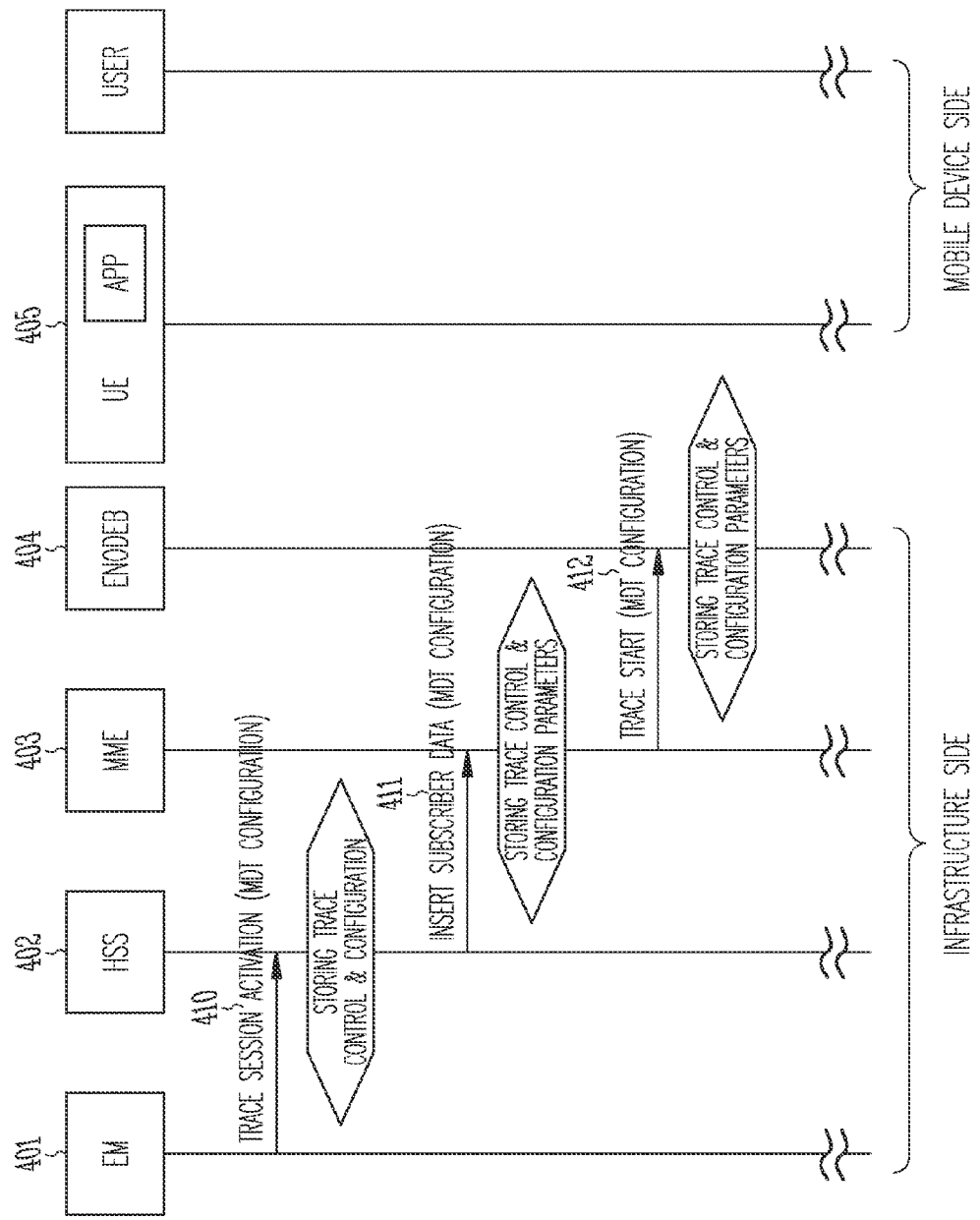

| MDT CONFIGURATION PARAMETERS | TYPE | DESCRIPTION | |
|---|---|---|---|
| >APPLICATION | BOOLEAN | VALUE "TRUE" INDICATES "APPLICATIONS INSTALLED ON THE MOBILE DEVICE ARE ALLOWED TO INITIATE MEASUREMENT REQUESTS". | ~502 |
| >USER | BOOLEAN | VALUE "TRUE" INDICATES "USERS OPERATING THE MOBILE DEVICE ARE ALLOWED TO INITIATE MEASUREMENT REQUESTS". | ~503 |
| >MAX NUMBER PER PERIOD | INTEGER (0..99) | THIS IE DEFINES A MAXIMUM NUMBER OF MEASUREMENT REQUESTS FROM MOBILE DEVICE SIDE PER TIME PERIOD (PLEASE cf BELOW). | ~504 |
| >PERIOD | ENUMERATED (MIN1, MIN5, MIN12, MIN30, MIN60) | THIS IE DEFINES THE TIME PERIOD FOR THE MAXIMUM NUMBER OF MEASUREMENT REQUESTS (AS DESCRIBED ABOVE). | ~505 |
| >MIN TIME INTERVAL | ENUMERATED (MIN1, MIN2, MIN3, MIN4, MIN5, ...) | THIS IE DEFINES A MINIMUM TIME INTERVAL BETWEEN TWO CONSECUTIVE MEASUREMENT REQUESTS FROM MOBILE DEVICE SIDE. | ~506 |
| >FILTERING | ENUMERATED (RAN, UE, BOTH) | THIS IE DEFINES WHERE BLOCKING OF MEASUREMENT REQUESTS IS TO BE PERFORMED. VALUE "RAN" INDICATES "BLOCKING OF MEASUREMENT REQUESTS IS DONE IN THE RAN", ETC. | ~507 |

Fig. 5

MEASUREMENT TRIGGERS FOR CUSTOMER CARE IN A WIRELESS NETWORK

PRIORITY APPLICATION

This application claims the benefit of priority to U.S. Provisional Application Ser. No. 61/872,591, filed Aug. 30, 2013, which is incorporated herein by reference in its entirety.

This application is a U.S. National Stage Application under 35 U.S.C. 371 from international Application No. PCT/US2013/069089, filed Nov. 8, 2013, which is hereby incorporated by reference in its entirety.

TECHNICAL FIELD

Embodiments described herein generally relate to wireless networks. Some embodiments relate generally to improving quality of service in a wireless network.

BACKGROUND

Wireless networks may enable mobile devices (e.g., radiotelephones, cellular telephones, user equipment (UE)) to communicate within that network with a fixed landline infrastructure (e.g., base stations, radio access network (RAN)). For example, in a cellular mobile network, user equipment may communicate with a fixed base station over a wireless channel. The wireless channel may be subjected to various forms of distortion (e.g., fading, multi-path distortion) and interference due to other forms of wireless communication on adjacent frequencies, terrain, and/or buildings. Thus, one geographical position in a wireless network's communication area (e.g., cell) may provide a clear signal path between the user equipment and the base station while another geographical position in the same communication area may be less than ideal for wireless communications. This can result in dropped calls, degraded call quality, and/or reduced data throughput for data communications.

There are general needs for improving quality of service in a wireless network.

BRIEF DESCRIPTION OF THE DRAWINGS

FIG. 4 illustrates a flow diagram for an embodiment of a method for measurement triggers for customer care.

FIG. 5 illustrates a table of an embodiment of Minimization of Drive Tests (MDT) configuration parameters.

DETAILED DESCRIPTION

Typically, a Mobile Network Operator (MNO) may measure, configure, and control a radio environment (e.g., channel, power) on both the infrastructure side (e.g., in the radio access network (RAN)) and on the user equipment side of the network.

The MNO may determine when to perform channel measurements (e.g., signal strength, data throughput) in order to generate a coverage map of a geographical area. Thus, the MNO requests the user equipment to perform the channel measurements at its present location, time stamp the resulting measurements, and send the results back to the MNO. These measurements may be combined with the measurements performed by a base station and the entire report sent to the core network for assessment. Such a process may be referred to in the art as Minimization of Drive Tests (MDT).

Figure 1:
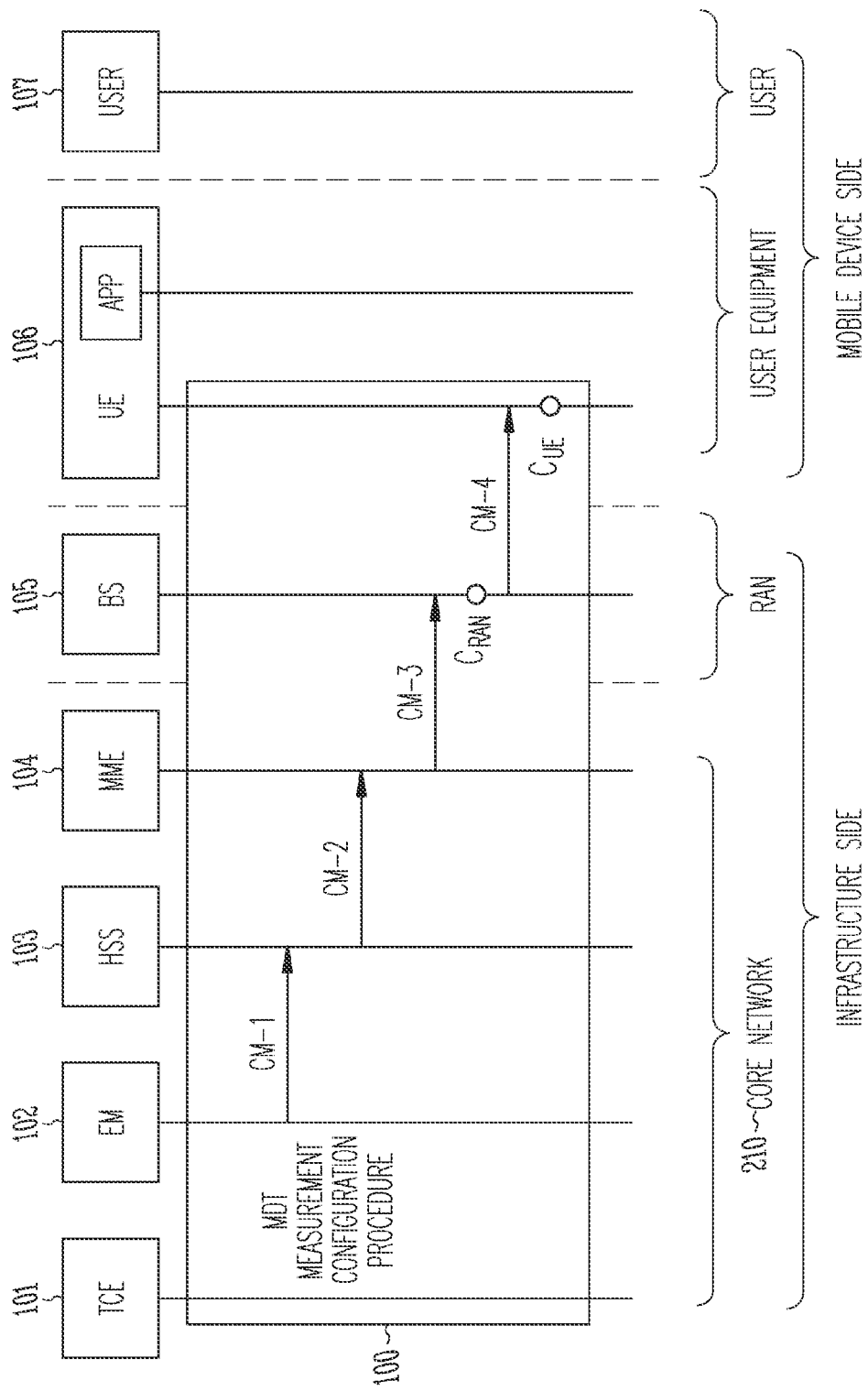
FIG. 1 illustrates a flow diagram of a typical Minimization of Drive Tests (MDT) procedure.

FIG. 1 illustrates a flow diagram of a typical MDT. The MDI measurement configuration procedure 100 to measure channel conditions may be initiated by the Trace Collection Entity (TCE) 101 in the core network 210. The TCE 101 provides a call information trace function at the call level for the user equipment 106. The call configuration details may be passed on to the base station 105 (e.g., eNodeB, NodeB, radio network controller RNC) through the Element Manager (EM) 102, the Home Subscriber Server (HSS) 103, and the Mobility Management Entity (MME) 104. The EM 102 may provide procedures for the control of the user equipment 106. The HSS 103 may be a central database that contains user-related and subscription-related information. The MME 104 may be the main control node for the network. The MME 104 may be responsible for the user equipment 106 idle mode tracking and paging procedures.

As shown in FIG. 1, the EM 102 generates configuration message-1 (CM-1) that is transmitted to the HSS 103. The HSS 103 takes its known information regarding the call and combines it with the CM-1 information to generate CM-2 that may be transmitted to the MME 104. The MME 104 may take the information in CM-2 and add any idle mode tracking and paging information to generate CM-3 that may be transmitted to the base station 105 that, with an antenna 207 (see FIG. 2), may be part of the radio access network (RAN). The base station 105 may then transmit CM-4 over the channel to the user equipment 106 that may be executing an application (APP) in response to the user 107.

However, there are times when the user equipment may be experiencing poor channel conditions, unbeknownst to the infrastructure side, and would like to report that experience to the MNO. The prior art has no mechanism for either the user or any applications on the user equipment to request channel measurements (i.e., to generate customer care measurement requests). Such a report may enable the MNO to adjust the channel conditions (e.g., resource allocation, transmit power, data throughput) in that geographical region and attempt to improve the experience of the user equipment (almost) in real-time. Alternatively, such a report may enable the MNO to improve at least one of network configuration, network coverage, and network capacity in the long run, e.g. by installing further base stations, remote radio heads or access points (offering the same or different radio access technologies) in order to enable handover of the user equipment in that geographical region also in an attempt to improve the experience of the user equipment.

The present embodiments of measurement triggers for customer care may enable a user or application on the user equipment to manually or automatically trigger a request for channel measurements to be made either by the user equipment (e.g., on downlink channels) and/or by the base station (e.g., on uplink channels) at the present time and geographical location where a problem occurred. In response to input received from the user or an application running on (i.e. being executed by) the user equipment, the user equipment may send this request to the MNO to trigger the channel measurement procedures instead of the MNO requesting the channel measurement procedures as done in FIG. 1. For reporting, other pieces of information may be added to these measurements as well, such as time stamps, location stamps, details about the service(s) being consumed, information about the (type of) application(s) being active, and so on. The collection of information about the service(s) being consumed and/or the type of traffic may be important for the MNO to know, for instance when MNO policies demand offloading of a first type of traffic (e.g., classified by a first QoS) to a first type of base station/access point/radio access technology, and offloading of a second type of traffic (e.g., classified by a second QoS) to a second type of base station/access point/radio access technology.

The above-mentioned request for channel measurements may also be understood as a customer care measurement request, a customer care activation request, or a customer care operation request.

The MNO may use this information in many ways. For example, the MNO may provide better resource allocation for certain applications to reduce or prevent future poor user experiences in the same area. Also, when the MNO receives a number of MDT reports for that particular geographical region from multiple users, the network may be enhanced. For instance, network enhancements may comprise installation of further base stations, remote radio heads or access points (offering the same or different radio access technologies) in order to improve network coverage and/or network capacity.

Alternatively, the MNO may use the collected details about the services being consumed as well as information about the types of applications being active for planning the additional deployment of different types of base station and/or access points/radio access technology.

Figure 2:
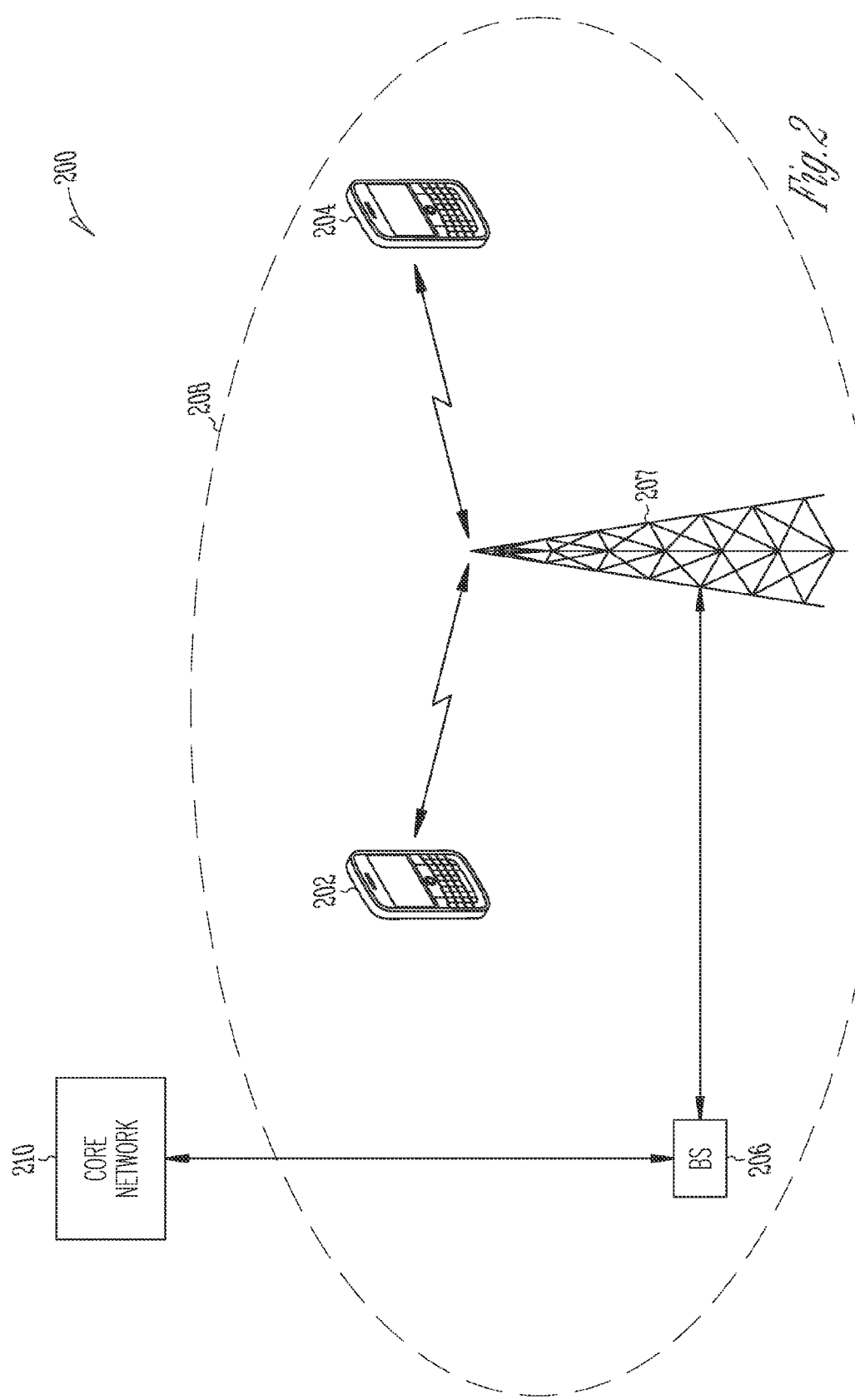
FIG. 2 illustrates a diagram of an embodiment of a wireless network.

FIG. 2 illustrates a diagram of an embodiment of a wireless network 200. The illustrated network 200 may be a cellular telephone network. For example, the cellular telephone network may use protocols for Global System for Mobile communication (GSM), for Universal Mobile Telecommunications System (UMTS), for Long-Term-Evolution (LTE), or for LTE-Advanced (LTE-A), code-division multiple access (CDMA), frequency-division multiple access (FDMA), or time-division multiple access (TDMA).

A base station 206 that may form the cell 208 (e.g., communication area) may communicate over wireless channels with user equipment 202, 204 that are within the cell 208. The base station 206 and antenna 207 may be coupled to a core network 210 so that the user equipment 202, 204 may communicate with the core network 210 through the base station 206.

The core network 210 may include any type of network, such as, but not limited to, wide-area networks (WAN), wireless networks (e.g. 802.11), the Public Switched Telephone Network (PSTN) network, ad hoc networks, personal area networks, or other combinations or permutations of network protocols and network types.

The wireless channels between the base station 206 and the user equipment 202, 204 may be susceptible to distortion and interference due to buildings, terrain, and moving objects causing multi-path distortion and fading. These conditions may cause an undesirable communication experience for a user by degrading the quality of a telephone call, causing the telephone call to drop, or reducing the data throughput of data communication.

In context of the present embodiments the term "telephone call" is by no means restricted to traditional circuit switched calls. Instead, the term "telephone call" may comprise data connections (i.e. packet switched calls) as well. A packet switched call may transport any form of multimedia content, such as audio (including voice) and/or video.

Figure 3:
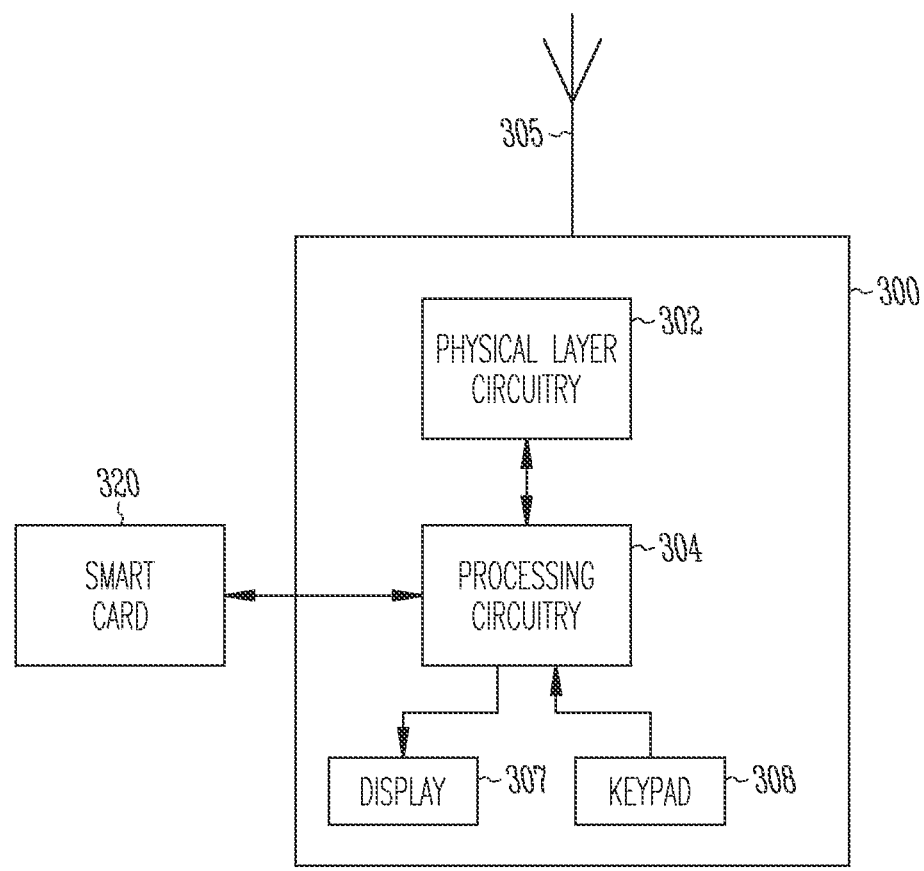
FIG. 3 illustrates a block diagram of an embodiment of user equipment.

FIG. 3 is a functional diagram of user equipment 300 in accordance with some embodiments. The user equipment 300 may be suitable for use as one or more of the user equipment 202, 204 (FIG. 2), although other configurations may also be suitable.

User equipment 300 may include physical layer circuitry 302 to communicate wirelessly with base stations, remote radio heads, access points, mobile communication devices, and other communication stations over an antenna 305. The user equipment 300 may also include processing circuitry 304 coupled to the physical layer circuitry 302 to perform other operations described herein. A display 307 (e.g., touchscreen) and/or keypad 308 may be included to enable a user to communicate with the user equipment 300.

A smart card 320 (e.g., subscriber identity module (SIM)) or memory card may be included in or coupled to the user equipment 300 to enable the user equipment 300 to operate in certain wireless networks. For example, user equipment 300 that operates in a Global System for Mobile communications (GSM) network may use a SIM 320 (or SIM card). For example, user equipment 300 that operates in a Universal Mobile Telecommunications System (UMTS) network may use a UICC (Universal Integrated Circuit Card) with an integrated Universal SIM (USIM) 320. Usually, a (U)SIM contains its unique serial number (ICCID), an international mobile subscriber identity (IMSI), security authentication and ciphering information, temporary information related to the local network, a list of the services the user has access to, and other pieces of information.

In another embodiment, the smart card 320 may include an indication to enable the user equipment to trigger customer car measurements (e.g., MDT measurements), as described subsequently (for instance, as part of the list of supported services).

In accordance with embodiments, the physical layer circuitry 302 may include the radio circuitry configured to establish a communication session between wireless communication stations and transmit and receive data frames between the wireless communication stations once the session has been established. The physical layer circuitry 302 may also be configured to transmit and receive acknowledgments as well as other communications between wireless communication stations.

In accordance with embodiments, the processing circuitry 304 may be configured to control execution of any processes of the wireless communication station in establishing and maintaining a multi-band Wi-Fi Direct Services with one or more other wireless communication stations. The processing circuitry 304 may also be configured to control execution of other multi-band Wi-Fi Direct process, such as those disclosed herein.

Although the user equipment 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the user equipment 300 may refer to one or more processes operating on one or more processing elements.

In some embodiments, the user equipment 300 may be part of a portable wireless communication device, such as a personal digital assistant (PDA), a laptop or portable computer with wireless communication capability, a tablet computer, a wireless telephone, a smartphone, a wireless headset, a pager, an instant messaging device, a digital camera, an access point, a television, a medical device (e.g., a heart rate monitor, a blood pressure monitor, etc.), or any other device that may receive and/or transmit information wirelessly. In some embodiments, the wireless communication station may include one or more of a keyboard, a display, a non-volatile memory port, multiple antennas, a graphics processor, an application processor, speakers, and other mobile device elements. The display may be an LCD or LED (e.g., organic light emitting diode) screen, including a touch screen.

The measurement triggers for customer care may be accomplished in multiple ways. For example, the MDT procedure may be enhanced to enable the user and/or the user equipment executing an application to trigger the channel measurements. In such an MDT enhancement, the user equipment may trigger an "immediate-MDT" procedure or a "logged-MDT" procedure. In another embodiment, the user equipment or the smart card coupled to the user equipment (e.g., smart card, SIM, SIM card, UICC with an integrated Universal SIM, memory module) may be pre-configured to store relevant control information for performing the customer care measurements (that may comprise parts of the MDT procedure). In another embodiment, the user equipment may be pre-configured to store relevant control information such as Open Mobile Alliance Device Management (OMA DM) Management Object (MO), for performing customer care measurements (which may comprise parts of the MDT procedure) by means of a configuration file.

The "immediate-MDT" procedure may be accomplished in real-time, when the channel problem has occurred. The user may cause a command to be sent to the core network in order to request the channel measurement (e.g., in uplink direction) be performed. Alternatively, the user may request the channel measurement (e.g., in downlink direction) be performed in the user equipment.

In the "logged-MDT" procedure, the user may cause a command to request channel measurement in the user equipment (e.g., in downlink direction) be performed. Furthermore, log files containing the measurement results may be stored in memory on mobile device side and send to the infrastructure side at a later time. For instance, this method may be applied when the user (or an application running on the mobile device) is not able to set-up a connection with the infrastructure side due to bad coverage at a certain location.

For example, if the channel quality is so bad that no signaling between the user equipment and the infrastructure is possible (e.g., the infrastructure is overwhelmed by a large number of connections), the user equipment may not be able to request an "immediate-MDT" procedure. In such an instance, the user equipment may log the MDT procedure request and transmit the request (e.g. for "immediate-MDT") when the channel (quality) has been restored and/or the infrastructure is able to handle such requests again.

FIG. 4 illustrates a flow diagram of an embodiment for configuration messaging between infrastructure elements 401-404 for a method for measurement triggers for customer care in the wireless network. This method assumes that the user equipment 405 has already gone through the attach procedure to the network. For example, after the user equipment 405 has powered on, the network and cell are selected, and a downlink synchronization and system information reception is performed. The user equipment 405 may also be synchronized with the network in the uplink direction.

The element manager (EM) 401 may be enabled to specify whether the trigger events may be allowed to be defined/initiated on the mobile device side, either by an application being executed by the user equipment 405 or by the user who is operating the user equipment 405. The EM 401 may also be enabled to specify a maximum number of the requests, per a particular time interval, and/or a time value between two consecutive requests.

One way to accomplish this may be to enhance a Trace Session Activation message sequence from the EM 401, as illustrated in FIG. 4. The enhancement adds additional information to configure requests from the mobile device side to the messages. The enhanced messages may be propagated from the EM 401 to the Evolved Node B 404 (e.g., ENodeB, base station, NodeB). Such an enhancement may involve modification of the S1 application protocol between the MME and the ENodeB 404.

Referring to FIG. 4, the EM 401 issues a Trace Session Activation message 410 to the HSS 402 in order to request activation of a trace session with the user equipment. The Trace Session Activation message 410 may be modified with the MDT configuration parameters as illustrated in FIG. 5. The HSS 402 may generate an Insert Subscriber Data message 414, containing the MDT configuration parameters that may be transmitted to the MME 403. The MME 403 sends a Trace Start message 412 to the ENodeB 404 with the MDT configuration parameters in order to start the trace session. The HSS 402, MME 403, and ENodeB 404 now store the Trace Control and MDT configuration parameters.

FIG. 5 illustrates a table of MDT configuration parameters. This table may include only a portion of the information that may be used in the configuration messaging illustrated in FIG. 4. The infrastructure side 401-404 of the network is configured to enable the mobile device side to trigger the channel measurements. In the interest of brevity and clarity, only that information relevant to configuring the infrastructure side 401-404 for the measurement triggers for customer care are discussed. One skilled in the art would know there may be additional information exchanged between the infrastructure elements 401-404 during an initial configuration.

The table shows a first column that identifies the various information elements (IE) that may define the MDT configuration parameters being set, a second column identifies the type of parameter (e.g., Boolean, integer, enumerated), and a third column that describes the parameter. The configuration parameters shown are for purposes of illustration only as the method for measurement triggers for customer care may be accomplished with other parameters as well.

The first row 502 shows an "application" (e.g., Application) parameter that may be a Boolean (e.g., logical 1 or logical 0) parameter. A true value for this parameter may indicate that applications installed on the user equipment are enabled to initiate the measurement requests.

The second row 503 shows a "user" (e.g., User) parameter that may be a Boolean parameter. A true value for this parameter may indicate that users operating user equipment are allowed to initiate measurement requests.

Likewise an "application with user control" parameter may be defined as a Boolean parameter. A true value for this parameter may indicate that all "customer care" measurements requested by an application on the mobile device are subject to user control (e.g., the device may be mandated to prompt the user, the user is requested to authorize the application's measurements requests, and so on). For sake of brevity this parameter is not shown in FIG. 5. A false value of the "application with user control" parameter may indicate that "customer care" measurements may be requested by applications on the mobile device and executed by the respective entities without further user interaction.

The third row 504 shows a "maximum number per period" (e.g., MaxNumberPerPeriod) parameter that may be an integer. This parameter may define a maximum number of measurement requests from the mobile device side per a predetermined time period.

The fourth row 505 shows the "time period" (e.g., Period) parameter that may be enumerated (e.g., a time value). This parameter may define the time period for the maximum number of measurement requests as described in the third row 504.

The fifth row 506 shows a "minimum time interval" (e.g., MinTimeInterval) parameter that may be enumerated. This parameter may define a minimum time interval between two consecutive measurement requests from the mobile device side.

The sixth row 507 shows a "filtering" (e.g., Filtering) parameter that may be enumerated (e.g., a network element). This parameter may define where blocking of the measurement request may be performed. For example, a value of "RAN" indicates blocking of the measurement requests may be performed in the RAN.

The parameters illustrated in the table of FIG. 5 may be inserted in a global part of the "MDT Configuration" information element. That may mean the configuration part for customer care measurements is applicable to both of the two existing flavors of MDT operation (namely, "immediate MDT" and "logged MDT").

In another embodiment, the parameters illustrated in the table of FIG. 5 may be inserted into the "immediate-MDT" sub-portion and/or the "logged-MDT" sub-portion of the MDT configuration parameters element if the MNO wants to have different sets of configurations for the "immediate-MDT" or "logged-MDT", respectively.

Alternatively, the parameters illustrated in the table of FIG. 5 may also be used in the context of a third flavor of MDT measurements to be defined ("customer-care_MDT") and placed within a new sub-portion of the "MDT Configuration" information element.

Figure 6:
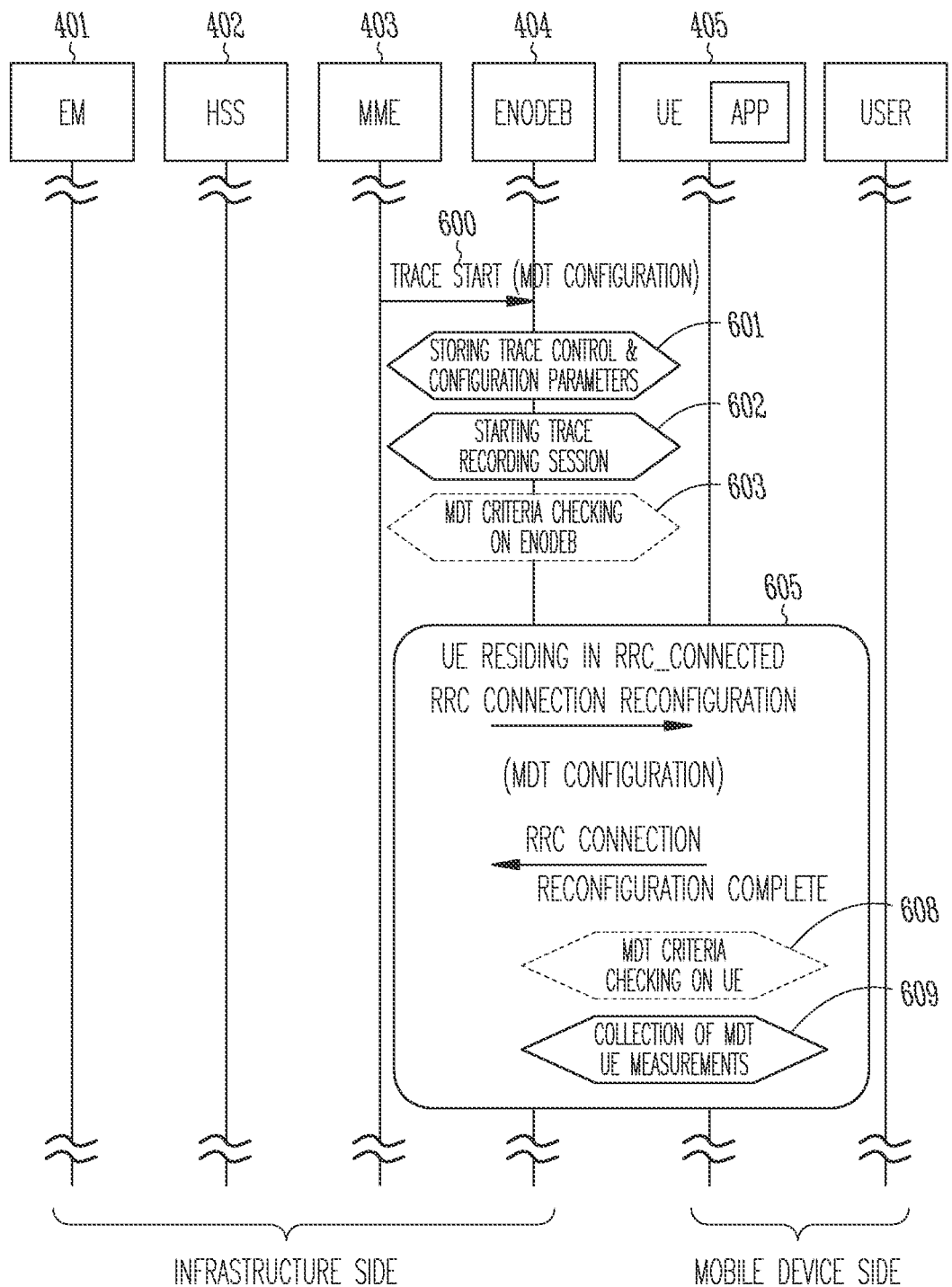
FIG. 6 illustrates a flow diagram of an embodiment of an over-the-air MDI configuration.

FIG. 6 illustrates a flow diagram of an embodiment of an over-the-air MDT configuration between the ENodeB 404 and the user equipment 405. This flow diagram details the channel enhancements to the radio resource control (RRC) protocol since the MDT configuration may be transported to the user equipment 405 via RRC.

If the user and/or an application being executed by the user equipment are enabled to directly request trigger events for MDT user equipment measurement to be collected by the user equipment and/or MDT RAN measurements to be collected in the RAN, then the MDT configuration transmitted from the infrastructure side to the user equipment over the channel may be enhanced accordingly.

The RRC signaling, illustrated in FIG. 6, may convey the enhanced MDT configuration from the ENodeB 404 to the user equipment 405. The enhanced messages may be the RRC Connection Reconfiguration (e.g., used to configure and reconfigure immediate-MDT for user equipment in RRC_Connected) and Logged Measurement Configuration (e.g., used to configure logged-MDT for user equipment in RRC_Idle while the respective user equipment is still in RRC_Connected).

The RRC Connection Reconfiguration message may be used to modify an RRC connection. For example, the RRC Connection Reconfiguration message may establish/modify/release radio bearers to perform handovers or to set-up/modify/release measurements. As part of the illustrated procedure, the non-access stratum (NAS) dedicated information may be transferred from the ENodeB to the user equipment. The following discussion may describe modifications of the RRC Connection Reconfiguration message in order to enable the mobile device side (i.e. the user and/or an application running on the user equipment) to directly request trigger events for the MDT measurements (as configured by the element manager (EM) 401).

The relevant information element inside the "Connection Reconfiguration" RRC message may be the "measConfig" Information Element (IE). This information element may specify the measurements to be performed by the user equipment and may cover intra-frequency, inter-frequency, and inter-RAT mobility as well as configuration of measurement gaps. The "measConfig" IE can be enhanced with an additional customer care information element that comprises at least one parameter to control the feature of the user equipment directly requesting (e.g., on request of the user operating the user equipment and/or an application running on the user equipment) trigger events for the MDT measurements.

Referring to FIG. 6, the MME 403 initiates a Trace Start message 600 to the ENodeB 404. As discussed previously, the Trace Start starts the trace session.

The ENodeB 404 may store the Trace Control and configuration parameters 601 from the Trace Start message 600. The ENodeB 404 may also start the trace recording session 602. In an embodiment, the ENodeB 404 may perform an MDT criteria check 603 of the channel measurements.

Once the ENodeB 404 is configured, the over-the-air configuration 605 may be performed. The user equipment 405 may be in a connected state 605 with the ENodeB 404 (e.g., RRC_CONNECTED). This configuration 605 may include the exchange of an RRC Connection Reconfiguration message from the ENodeB 404 to the user equipment 405 on the mobile device side. This message may comprise the MDT configuration as discussed previously with reference to FIG. 5. The user equipment 405 may respond with an "Connection Reconfiguration Complete" RRC message back to the ENodeB 404.

In an embodiment, the user equipment 405 may perform an MDT criteria check 608 of the channel measurements. The user equipment 405 may now start the collection of MDT user equipment measurements 609 (e.g., in RRC_Connected mode of operation).

Figure 7:
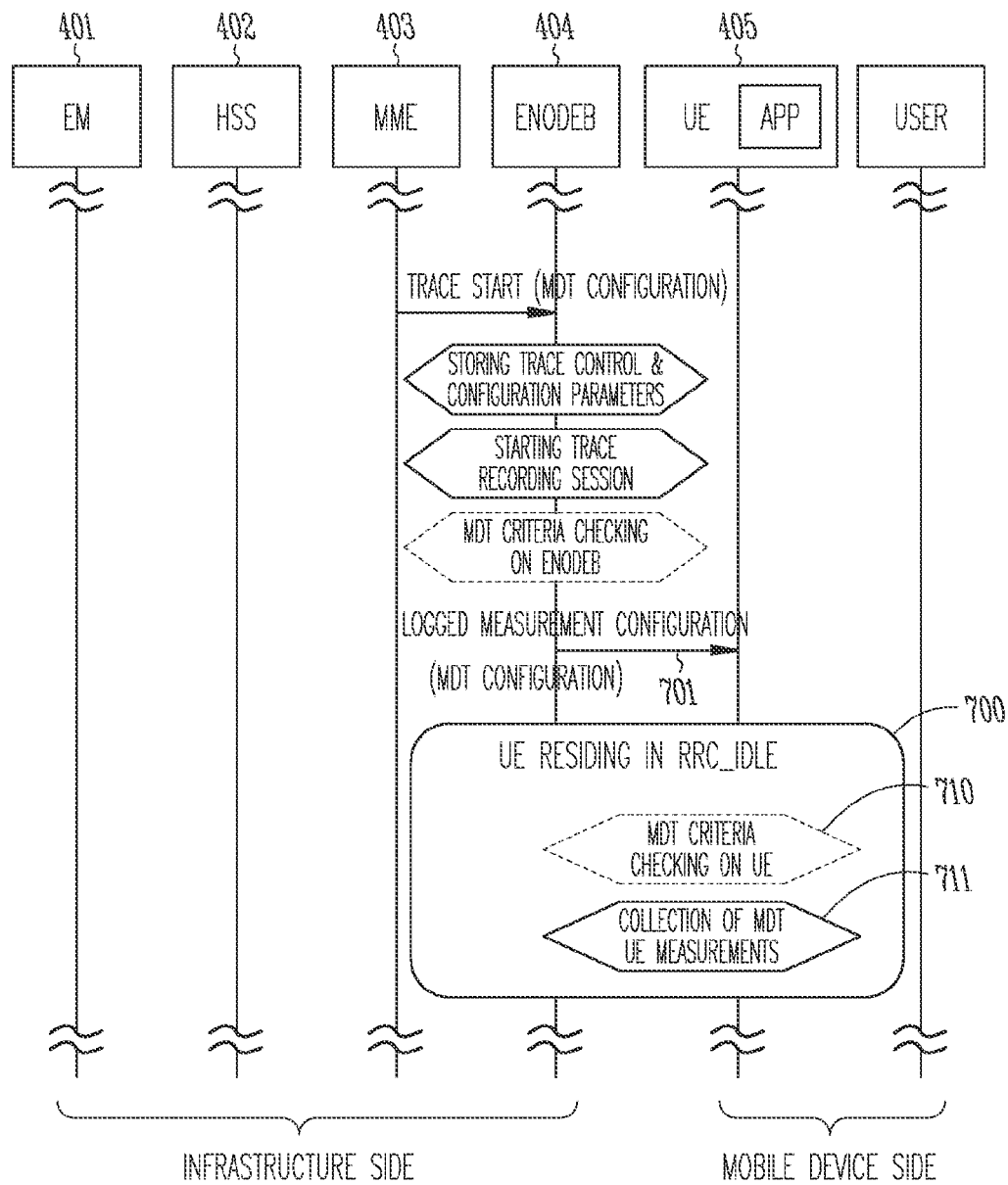
FIG. 7 illustrates a flow diagram of an embodiment of a logged-MDT measurement configuration message.

FIG. 7 illustrates a flow diagram of an embodiment of a logged-MDT measurement configuration RRC message. The user equipment 405 may receive the "Logged Measurement Configuration" RRC message 701 from the ENodeB 404. This message may comprise the MDT configuration parameters as described previously in FIG. 5. The user equipment 405 may then transition into an idle state 700 (e.g., RRC_IDLE).

In the idle state 700 the user equipment may perform an MDT criteria check 710 of the channel measurements. The user equipment 405 may then start the collection of MDT user equipment measurements 711 (e.g., in RRC_Idle mode of operation).

Figure 8:
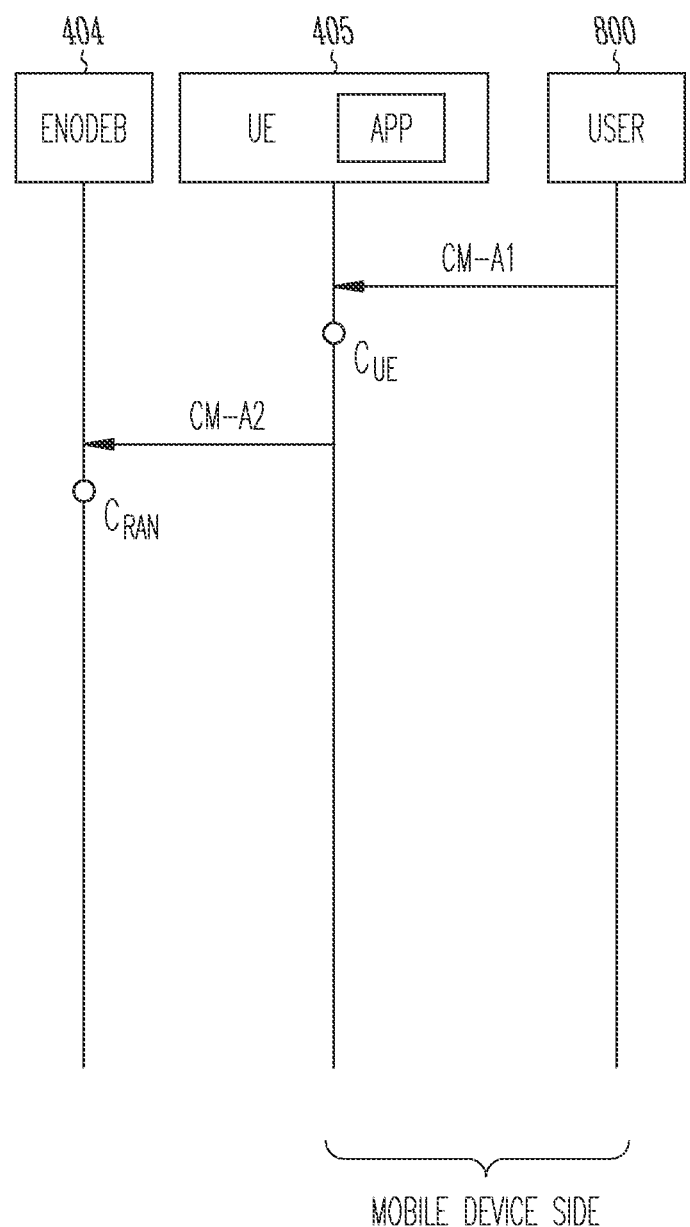
FIG. 8 illustrates a flow diagram of an embodiment of an execution of user initiated MDT measurements.
Figure 9:
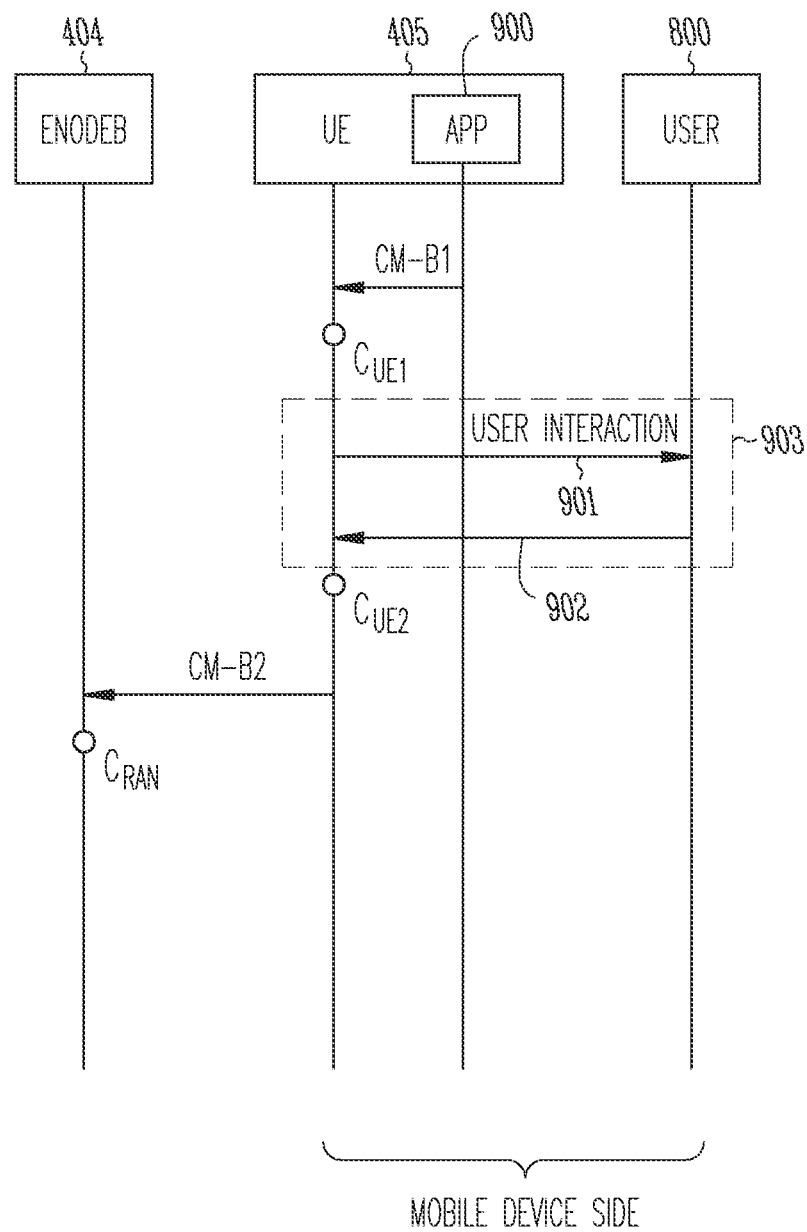
FIG. 9 illustrates a flow diagram of an embodiment of an execution of application initiated MDT measurements.

Once the user equipment has the MDT configuration parameters (see FIG. 5), the MDT functionality may be executed as illustrated in FIGS. 8 and 9. FIG. 8 shows a user initiated MDT measurement. FIG. 9 shows an application initiated MDT measurement. Either of these embodiments may be "immediate-MDT" or "logged-MDT" as previously described. Additionally, either embodiment may specify trigger events for MDT user equipment measurements to be collected by the user equipment (for instance, pertaining to downlink channel quality, or any other MDT data that may be relevant in the given scenario) and/or MDT RAN measurements to be collected by the RAN (for instance, pertaining to uplink channel quality, or any other MDT data that may that may be relevant in the given scenario).

Referring to FIG. 8, the user 800 is enabled to directly request MDT with configuration message CM-A1: user equipment measurements to be collected by the user equipment 405 and/or MDT RAN measurements to be collected by the RAN. The user may accomplish this by hitting a key on a keypad of the user equipment or a soft key on a touchscreen of the user equipment. In an embodiment, the user 800 may be enabled to define trigger events with CM-A1 for these two types of measurements. The configuration message CM-A1 may include reporting details such as reporting interval and/or reporting amount, in the case of "immediate-MDT", or logging details such as logging interval and/or logging duration, in the case of "logged-MDT". If configured to do so, the user equipment 405 may perform filtering of measurement requests upon receipt of configuration message CM-A1 at $C_{UE}$ based on some predetermined filter criteria. The user equipment 405 may transmit customer care measurement results to an ENodeB with one of a "UEInformationResponse" RRC message to transfer the "LogMeasReport" IE to the base station (for logged-MDT) or a "MeasurementReport" RRC message to transfer the "MeasResults" IE to the base station (for Immediate-MDT).

The filter criteria may have been received from the infrastructure side during the MDT configuration with the message CM-4 as seen previously. In other embodiments, the filter criteria may have been obtained previously via OMA DM or stored in a smart card (e.g., a SIM card, or an UICC with an integrated Universal SIM) that may be plugged into the mobile device.

If the user's request of CM-A1 is granted (i.e., if all of the filtering criteria defined by the MNO are met), the user equipment 405 may start collecting MDT user equipment measurement. If the user's intention is to request measurements from the infrastructure side (e.g., from a particular RAN node), the user equipment may use an active RRC connection in order to convey configuration message CM-A2 to the ENodeB 404.

Referring to FIG. 9, an application 900 resident on the mobile device may be enabled to directly request with configuration message CM-B1 user equipment measurements to be collected by the user equipment 405 and/or MDT RAN measurements to be collected by the RAN. In an embodiment, the application 900 may be enabled to define trigger events with CM-B1 for these two types of measurements. The configuration message CM-B1 may include reporting details such as reporting interval and/or reporting amount, in the case of "immediate-MDT", or logging details such as logging interval and/or logging duration, in the case of "logged-MDT".

FIG. 9 also shows an optional user interaction sequence 903. The user 800 may be prompted 901 through a user interface of the mobile device to accept or reject 902 the measurement requests envisaged by the application 900. In another embodiment, the user 800 may be asked through the user interface of the mobile device to accept or reject parts of the application's measurement requests.

The user equipment 405, if it has been configured to do so, may perform filtering of the measurement requests either upon receipt of the configuration message CM-B1 at $C_{UE1}$ or after completion of the user interaction sequence 903 at $C_{UE2}$.

The filter criteria may have been received from the infrastructure side during the MDT configuration with the message CM-4 as seen previously. In other embodiments, the filter criteria may have been obtained previously via OMA DM or stored in a smart card (e.g., a SIM card, or an UICC with an integrated Universal SIM) that may be plugged into the mobile device.

If the application's request of CM-B1 is granted (i.e., if all of the filtering criteria defined by the MNO are met), the user equipment 405 may start collecting MDT user equipment measurement. If the application's intention is to request measurements from the infrastructure side (e.g., from a particular RAN node), the user equipment may use an active RRC connection in order to convey configuration message CM-B2 to the ENodeB 404.

If MDT RAN Measurements are to be collected by some infrastructure nodes, the RAN may be informed about this fact. If the user equipment is in "Connected" mode of operation already (e.g., in RRC_Connected), the user equipment may, for example, use the "measResults" Information Element (IE) within the "MeasurementReport" RRC message for this. In another embodiment, a new IE in any other RRC message that is sent from the user equipment to the infrastructure may be used. In yet another embodiment, a new IE in a new pair of RRC messages to be exchanged between the mobile device and the infrastructure may be used.

If the user equipment is residing in "Idle" mode of operation (e.g., in RRC_Idle), the user equipment may first have to establish an RRC connection to the infrastructure side. This may mean that the user equipment may have to switch to "Connected" mode of operation at least temporarily so that the corresponding infrastructure nodes can be informed. The RRC message sequence RRCConnectionRequest, RRCConnectionSetup, and RRCConnectionSetupComplete may be used for this using the normal RRC Connection Establishment procedure. A corresponding IE may be included in the "RRCConnectionRequest" or "RRCConnectionSetupComplete" RRC messages. In another embodiment, a corresponding IE may be included in any other RRC message that may be sent from the user equipment to the infrastructure.

Once the user's or the application's measurement request (generally speaking the user equipment's measurement request sent on behalf of the user operating the user equipment and/or an application running on the user equipment) has reached the respective infrastructure node (e.g., base station), the infrastructure side may start yet another filtering procedure at $C_{RAN}$ in FIGS. 8 and 9 if it was configured to do so by the MNO. The filtering may be performed according to the filtering details received during the MDT configuration parameters with message CM-3.

Once the user's or the application's measurement request (generally speaking the user equipment's measurement request sent on behalf of the user operating the user equipment and/or an application running on the user equipment) has been accepted, the respective infrastructure node (e.g., base station) may start collecting MDT RAN Measurements as requested by the user and/or the application (and/or as configured by the MNO). The process of collecting MDT UE and/or MDT RAN measurements may include checking of the chronological repetition patterns of the issued measurement requests aiming at preventing misuse of this feature. The process of reporting MDT UE and/or MDT RAN measurements may also include checking of the chronological repetition patterns of the issued measurement requests aiming at preventing misuse of this feature. This checking may be accomplished by the mobile device or the infrastructure node double-checking if the timing filtering criteria received in the MDT configuration message CM-3 for RAN-based filtering and CM-4 for the user equipment-based filtering are met.

The MDT measurements may be executed substantially immediately since there may be an immediate need to react to the request received from the user or the application based on current channel conditions. If the user equipment is residing in the "Connected" mode of operation, "immediate-MDT" methods may be applicable. This may mean that the measurements proposed by an application and/or authorized by the user and/or selected by the user may be performed immediately in the user equipment or on the infrastructure side and included in the normal MDT reports for later evaluation by the MNO. In an embodiment, the MDT measurements may be marked as being initiated by a customer care request received from the user or the application in order to distinguish these measurements from normal legacy MDT measurements.

If the user equipment is residing in the "Idle" mode of operation, normal "logged-MDT" methods may be used wherein the MDT measurements may be taken and logged on the mobile device side for future transmission to the infrastructure. As in the "immediate-MDT" embodiment, these MDT measurements may be marked in order to distinguish them from normal legacy MDT measurements.

As discussed previously, the MNO may store relevant control information in a smart card (e.g., SIM card, or UICC with an integrated Universal SIM) connectable to a mobile device. The smart card may contain some preconfigured control settings. For example, the control settings may tell the user equipment whether an application or a user is enabled (in other words, allowed to request) to start the customer care measurements. The control setting may also tell the user equipment whether the user equipment is to prompt the user when an application wants to request the customer care measurements. While the customer care measurements may be collected by the user equipment, the smart card may check how often the user or an application tries to request the procedure and may be able to deny the request if the number is above a threshold.

If so configured, the smart card may contain instructions for the user equipment to perform filtering of the customer care measurement requests based on filtering criteria stored in the smart card by the MNO. The filtering criteria and control information on the smart card memory may be updated during operation of the user equipment. The updating operation may be controlled by the MNO due to write protections on the smart card.

Embodiments may be implemented in one or a combination of hardware, firmware, and/or software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

Also as discussed previously, the MNO may provide relevant control information to the user equipment in form of an OMA DM Management Object (MO). This configuration file may contain some preconfigured control settings, too. For example, the control settings may tell the user equipment whether an application or a user is enabled (in other words, allowed to request) to start the customer care measurements. The control setting may also tell the user equipment whether the user equipment is to prompt the user when an application wants to request the customer care measurements. While the customer care measurements may be collected by the user equipment, a trusted execution environment (for instance an execution environment coupled to or residing in a TPM (Trusted Platform Module)) implemented inside the user equipment may check how often the user or an application tries to request the procedure and may be able to deny the request if the number is above a threshold.

Similar to the above, the configuration file received from the MNO may contain instructions for the user equipment to perform filtering of the customer care measurement requests. The filtering criteria and control information in the configuration file may be updated during operation of the user equipment. The updating operation may be controlled inside the user equipment by the trusted execution environment (for instance an execution environment coupled to or residing in a TPM (Trusted Platform Module)).

Examples

The following examples pertain to further embodiments.

Example 1 is a method for activation of customer care measurement operations, the method comprising: composing, in a network entity, configuration parameters enabling a mobile device to request customer care measurement operations; submitting the configuration parameters to the mobile device; enabling the mobile device to request the customer care measurement operations from a communication device according to the configuration parameters; filtering customer care measurement requests from the mobile device, in the communication device, according to the configuration parameters; collecting customer care measurement results in the communication device according to the configuration parameters; and reporting the customer care measurement results according to the configuration parameters.

In Example 2, the subject matter of Example 1 can optionally include wherein the composition of the configuration parameters comprises specifying thresholds in order to restrict an amount of customer care measurements to be collected by the communication device.

In Example 3, the subject matter of Examples 1-2 can optionally include wherein the communication device is at least one of the mobile device or an infrastructure node to which the mobile device is connected.

In Example 4, the subject matter of Examples 1-3 can optionally include wherein the infrastructure node is at least one of an eNodeB, a NodeB, or an RNC.

In Example 5, the subject matter of Examples 1-4 can optionally include wherein filtering the customer care measurement requests from the mobile device in the communication device comprises at least one of: comparing a number of received requests with a predetermined threshold or executing customer care measurement operations based on a result of comparing the number of received requests with the predetermined threshold.

In Example 6, the subject matter of Examples 1-5 can optionally include wherein enabling the mobile device to request the customer care measurement operations comprises enabling the mobile device to generate customer care measurement requests on behalf of at least one of: a user operating the mobile device, or an application being executed by the mobile device.

In Example 7, the subject matter of Examples 1-6 can optionally include wherein the generation of customer care measurement requests by the mobile device is based on an input received from the user of the mobile device.

In Example 8, the subject matter of Examples 1-7 can optionally include wherein the generation of customer care measurement requests by the mobile device is based on an input received from an application being executed on the mobile device.

Example 9 is a method for customer care measurement activation performed by a mobile device, the method comprising: a mobile device receiving customer care measurement configuration parameters from a communication device; the mobile device transmitting a customer care measurement request to the communication device according to the configuration parameters; performing customer care measurements of a channel between the mobile device and the communication device according to the configuration parameters; and transmitting customer care measurement results to the communication device according to the configuration parameters.

In Example 10, the subject matter of Example 9 can optionally include the mobile device logging the customer care measurement results while in an idle state.

In Example 11, the subject matter of Examples 9-10 can optionally include wherein transmitting the customer care measurement results to the communication device comprises the mobile device being in a connected state and transmitting the customer care measurement results to an ENodeB in one of a radio resource control (RRC) "UEInformationResponse" message or an RRC "Measurement Report" message.

In Example 12, the subject matter of Examples 9-11 can optionally include wherein the mobile device transmitting the customer care measurement request to the communication device comprises the mobile device transmitting a CM-A2 message to an ENodeB.

In Example 13, the subject matter of Examples 9-12 can optionally include wherein the customer care measurement request to the communication device is in response to an input from a user of the mobile device or a request from an application being executed by the mobile device.

In Example 14, the subject matter of Examples 9-13 can optionally include wherein customer care measurements comprise MDT (Minimization of Drive Tests) measurements.

Example 15 is a user equipment for operating in a wireless network, the user equipment comprising: physical layer circuitry to communicate with an enhanced Node B (eNodeB) of the wireless network; and processing circuitry, coupled to the physical layer, to execute a customer care measurement operation, the processing circuitry to receive configuration parameters from the e NodeB, transmit a request to the eNodeB for customer care measurements in response to the configuration parameters, perform the customer care measurements, and transmit customer care measurement results to the eNodeB.

In Example 16, the subject matter of Example 15 can optionally include wherein a smart card is coupled to the processing circuitry and comprising an indication to enable the user equipment to trigger customer care measurements.

In Example 17, the subject matter of Examples 15-16 can optionally include wherein the processing circuitry is further configured to execute an application that generates the request for customer care measurements.

In Example 18, the subject matter of Examples 15-17 can optionally include wherein the processing circuitry generates a request for user interaction in response to the application generating the request for customer care measurements.

In Example 19, the subject matter of Examples 15-18 can optionally include wherein the physical layer circuitry receives a radio resource control (RRC) "LoggedMeasurementConfiguration" message comprising configuration parameters for customer care measurement operations and the processing circuitry further logs the customer care measurements in response to the "LoggedMeasurementConfiguration" message when the user equipment is in an idle state.

In Example 20, the subject matter of Examples 15-19 can optionally include wherein the physical layer circuitry receives a radio resource control (RRC) "ConnectionReconfiguration" message comprising configuration parameters for customer care measurement operations and the processing circuitry further collects the customer care measurements when the user equipment is in a connected state.

Example 21 is a method for Minimization of Drive Test (MDT) activation in a base station, the method comprising: receiving configuration parameters from a network entity that enables a mobile device to request MDT measurement operations; submitting the configuration parameters to the mobile device; enabling the mobile device to request the MDT measurement operations from the base station according to the configuration parameters; filtering MDT measurement requests from the mobile device, in the base station, according to the configuration parameters; collecting MDT measurement results in the base station according to the configuration parameters; and reporting the MDT measurement results to a network entity according to the configuration parameters.

In Example 22, the subject matter of Example 21 can optionally include wherein reporting the MDT measurement results to the network entity comprises reporting the MDT measurement results to a core network.

What is claimed is:

1. User equipment for operating in a wireless network, the user equipment comprising:
   physical layer circuitry to communicate with an enhanced Node B (eNodeB) of the wireless network; and
   processing circuitry, coupled to the physical layer, to execute a customer care measurement operation, the processing circuitry to receive configuration parameters from the eNodeB, transmit a request to the eNodeB for customer care measurements in response to the configuration parameters when channel quality enables signaling between the user equipment and the eNodeB or log the request when channel quality precludes signaling between the user equipment and the eNodeB, perform the customer care measurements, and transmit customer care measurement results to the eNodeB, wherein the customer care measurements comprise signal strength and data throughput measurements, and wherein the configuration parameters include Minimization of Drive Tests (MDT) configuration parameters which include a maximum number of customer care measurements per period, a period length, a minimum time interval between two consecutive customer care measurements, an indication whether applications installed on the user equipment are allowed to initiate measurement requests, an indication whether a user of the user equipment is allowed to initiate measurement requests, and an indication of where blocking of measurement requests is to be performed.

2. The user equipment of claim 1 wherein a smart card is coupled to the processing circuitry and comprising an indication to enable the user equipment to trigger customer care measurements.

3. The user equipment of claim 1 wherein the processing circuitry is further configured to execute an application that generates the request for customer care measurements.

4. The user equipment of claim 3 wherein the processing circuitry generates a request for user interaction in response to the application generating the request for customer care measurements.

5. The user equipment of claim 1 wherein the physical layer circuitry receives a radio resource control (RRC) "LoggedMeasurementConfiguration" message comprising configuration parameters for customer care measurement operations and the processing circuitry further logs the customer care measurements in response to the "LoggedMeasurementConfiguration" message when the user equipment is in an idle state.

6. The user equipment of claim 1 wherein the physical layer circuitry receives a radio resource control (RRC) "ConnectionReconfiguration" message comprising configuration parameters for customer care measurement operations and the processing circuitry further collects the customer care measurements when the user equipment is in a connected state.

7. A non-transitory computer-readable storage medium that stores instructions for execution by processing circuitry of user equipment to perform operations over a channel in a wireless network, the operations to:
  receive configuration parameters from an eNodeB;
  transmit a request to the eNodeB for customer care measurements in response to the configuration parameters when channel quality enables signaling between the user equipment and the eNodeB or log the request when channel quality precludes signaling between the user equipment and the eNodeB;
  perform the customer care measurements; and
  transmit customer care measurement results to the eNodeB, wherein the customer care measurements comprise signal strength and data throughput measurements, and wherein the configuration parameters include Minimization of Drive Tests (MDT) configuration parameters which include a maximum number of customer care measurements per period, a period length, a minimum time interval between two consecutive customer care measurements, an indication whether applications installed on the user equipment are allowed to initiate measurement requests, an indication whether a user of the user equipment is allowed to initiate measurement requests, and an indication of where blocking of measurement requests is to be performed.

* * * * *